United States Patent [19]
Ono

[11] Patent Number: 6,009,381
[45] Date of Patent: Dec. 28, 1999

[54] REMOTE CONTROL MEASURING SYSTEM

[75] Inventor: Kenji Ono, Kanagawa, Japan

[73] Assignee: Mitutoyo Corporation, Kanagawa, Japan

[21] Appl. No.: 09/089,353

[22] Filed: Jun. 3, 1998

[30] Foreign Application Priority Data

Jun. 10, 1997 [JP] Japan .................................. 9-152621

[51] Int. Cl.⁶ .................................................. G05B 19/00
[52] U.S. Cl. ........................ 702/188; 702/186; 709/217; 379/106.01
[58] Field of Search ................................... 702/186, 188, 702/474.24, 474.22; 364/188, 474.22, 474.23, 474.24; 709/186, 217, 218; 379/100.05, 106.01

[56] References Cited

U.S. PATENT DOCUMENTS

| | | | |
|---|---|---|---|
| 4,789,973 | 12/1988 | Mabuchi ................................... | 369/24 |
| 4,901,253 | 2/1990 | Iwano et al. ............................. | 702/168 |
| 5,220,380 | 6/1993 | Hirata et al. ........................ | 379/100.05 |
| 5,347,646 | 9/1994 | Hirosawa et al. .................... | 379/93.02 |
| 5,349,675 | 9/1994 | Fitzgerald et al. ...................... | 709/217 |
| 5,379,409 | 1/1995 | Ishikawa ................... | 714/46 |
| 5,418,730 | 5/1995 | Mariani et al. ..................... | 364/474.22 |
| 5,512,979 | 4/1996 | Ogura .................................. | 379/100.05 |
| 5,712,978 | 1/1998 | Lerner et al. ........................... | 709/208 |
| 5,726,912 | 3/1998 | Krall, Jr. et al. ....................... | 702/186 |
| 5,727,248 | 3/1998 | Ogura . | |

*Primary Examiner*—Patrick Assouad
*Assistant Examiner*—Bryan Bui
*Attorney, Agent, or Firm*—McDermott, Will & Emery

[57] ABSTRACT

In a measuring room 1, a three-dimensional measuring apparatus 2 for measuring an object, a control apparatus 3 for driving and controlling the three-dimensional measuring apparatus 2, and a host computer 4 for transmitting a measurement instruction to the control apparatus 3 and receiving measured information therefrom are disposed. In an operating room 7, which is disposed at a remote place of the measuring room 1, a remote operating apparatus 9 and a CAD/CAT system 10 are disposed. The remote operating apparatus 9 is connected to a host computer 4 through a LAN. The CAD/CAT system 10 is linked to the remote operating apparatus 9. The remote operating apparatus 9 generates a measurement instruction in response to an input operation on a measurement instruction screen and transmits a part program generated by the CAD/CAT system 10 to the host computer 4. The remote operating apparatus 9 and the host computer 4 are communicated by a communication protocol of TCP/IP.

8 Claims, 4 Drawing Sheets

FIG. 4A

FEDRAT/MESVEL, MMPS, 3  ←(SET OF MEASUREMENT VELOCITY)

FEDRAT/POSVEL, MMPS, 150  ←(SET OF MOVING VELOCITY)

FIG. 4B (CIRCLE MEASUREMENT)

MEAS/CIRCLE, FA(BUF_1), 3
GOTO/ABS, CART, 0.000000, 0.000000, 10
PTMEAS/CART, 10.0000, 0.0000, 0.0000, I-J-K, -1.0000, 0.0000, 0.0000
PTMEAS/CART, -10.0000, 0.0000, 0.0000, I-J-K, 1.0000, 0.0000, 0.0000
PTMEAS/CART, 0.0000, 10.0000, 0.0000, I-J-K, 0.0000, -1.0000, 0.0000
ENDMES 6,009,381

REMOTE CONTROL MEASURING SYSTEM

BACKGROUND OF THE INVENTION

1. Field of the Invention

The present invention relates to a remote control measuring system suitable for remote-controlling a three-dimensional measuring apparatus or the like.

2. Prior Art

As an offline teaching supporting system that generates a part program that defines a measurement procedure of a numerically controllable three-dimensional measuring apparatus, a CAT (Computer Aided Testing) system is known. The CAT system automatically generates a measurement and operation procedure of a three-dimensional measuring apparatus corresponding to CAD (Computer Aided Design) data of a measurement object. With the CAT system, even inexperienced operators can effectively generate part programs. In addition, with the CAT system, the operation efficiency of the three-dimensional measuring apparatus can be prevented from decreasing.

However, in the conventional CAT system, unless a part program is temporarily stored as a file, the part program cannot be used. Moreover, in the offline teaching mode, the three-dimensional measuring apparatus should be driven and controlled program by program. Thus, if an error takes place in the three-dimensional measuring apparatus that is operating, the measurement of the apparatus cannot be continued. Furthermore, in the operation of the three-dimensional measuring apparatus, the content of the measurement procedure cannot be changed.

Moreover, even if a measurement procedure has only several measurement points, a part program file should be generated. Thus, the operation of the CAT system is troublesome. Furthermore, unless a measured result is converted into a file, it cannot be fed back to the CAT system.

When a three-dimensional measuring apparatus disposed in a measuring room whose inner temperature is strictly controlled is remote-controlled from another operating room, special-purpose cables should be connected from a numeric control apparatus of the three-dimensional measuring apparatus to a host computer and an operating panel disposed in the operating room. Data should be transmitted at a high transmission rate between the control apparatus and the host computer. In addition, many signals should be exchanged. Thus, the number and/or radius of cables connected between the control apparatus and the host computer becomes large. When the cables are extended from the measuring room to the operating room, the cable connections become complicated. Moreover, to prevent the cables from being affected by noise and signal attenuations, the lengths of the cables should not exceed several meters. Conventionally, the remote control is limited for a very short distance between two adjacent rooms.

SUMMARY OF THE INVENTION

An object of the present invention is to provide a remote control measuring system that allows a remote control to be performed without a limit of distance and measured results to be fed back to a remote operating room side on real time basis.

A first aspect of the present invention is a remote control measuring system, comprising a measuring apparatus, a control apparatus for controlling and driving said measuring apparatus corresponding to a measurement command and obtaining measured information of said measuring apparatus, a host computer for transmitting the measurement command to said control apparatus corresponding to a measurement instruction and receiving the measured information therefrom, and a remote operating apparatus for transmitting the measurement instruction to said host computer through a communication network and receiving the measured information therefrom, wherein said remote operating apparatus displays a measurement instruction screen, generates the measurement instruction in response to an input operation on the measurement instructions screen, transmits the measurement instruction to said host computer, and displays the measured information received from said host computer on the measurement instructions screen.

A second aspect of the present invention is a remote control measuring system, comprising a measuring apparatus, a control apparatus for controlling and driving said measuring apparatus corresponding to a measurement command and obtaining measured information of said measuring apparatus, a host computer for transmitting the measurement command to said control apparatus corresponding to a measurement instruction and receiving the measured information therefrom, a remote operating apparatus for transmitting the measurement instruction to said host computer through a communication network and receiving the measured information therefrom, and a CAD/CAT (Computer Aided Design/Computer Aided Testing) system linked to said remote operating apparatus, wherein said remote operating apparatus has a measurement instruction screen displaying function and a CAD/CAT system connecting/switching function, and wherein said remote operating apparatus switches to a screen of said CAD/CAT system in response to an input operation on the measurement instruction screen, allows the operator to input a command on a figure displayed on the screen of said CAD/CAT system, transmits part programs corresponding to measurement elements generated in said CAD/CAT system to said host computer, and displays measured information received from said host computer to the measurement instruction screen.

According to the first aspect of the present invention, a remote operating apparatus is disposed. The remote operating apparatus is disposed so as to be connected to a host computer through a communication network. The host computer transmits a measurement command to a controlling apparatus for controlling a measuring apparatus and receives measured information therefrom. When an instruction data is input on a measurement instruction screen displayed by the remote operating apparatus, the remote operating apparatus generates a measurement instruction and transmits it to the host computer. The host computer receives the transmitted measurement instruction to drive and control the measuring apparatus through the control apparatus. Thus, a measurement is performed on real time basis. The resultant measured information, which includes measured data and error information, is immediately displayed on the measurement instruction screen of the remote operating apparatus.

According to the second aspect of the present invention, when an instruction data is input on a measurement instruction screen displayed by a remote operating apparatus, the screen is switched to a screen of a CAD/CAT system linked to the remote operating apparatus. When a measurement instruction is input on the screen of the CAD/CAT system, the remote operating apparatus generates a part program corresponding to a measurement element so as to cause the CAD/CAT system to execute the measurement instruction. Since the part program is transmitted from the remote operating apparatus to the host computer, it causes the measuring apparatus to measure an object on real time basis through the control apparatus.

Thus, in comparison with a conventional system that temporarily stores a part program as a file, the operation of the system according to the present invention becomes simple. If an error takes place, the operator can immediately know the occurrence thereof and take proper countermeasures such as changing the content of the measurement procedure and resuming the measurement. In addition, according to the present invention, since a measurement instruction and measured information are exchanged between the host computer and the remote operating apparatus through a communication network, there is no restriction about the distance for which a remote control is performed.

When the host computer and the remote operating apparatus are mutually communicated corresponding to a communication protocol of TCP/IP, the measuring apparatus can be remotely controlled anywhere in the world through Internet as well as a private communication network such as LAN and WAN.

When data is mutually communicated between the remote operating apparatus and the CAD/CAT system corresponding to a communication protocol of TCP/IP, they can be mutually connected through a communication network. Thus, for example, when a design department, a measurement department, and a measuring room are disposed at remote positions each other, they can be tightly connected so as to construct an organic measuring system in a wide range.

In addition, with a photographing device that photographs a measurement state of the measuring apparatus, the host computer is able to transmit picture information photographed by the photographing device to the remote operating apparatus through the communication network, and the remote operating apparatus is able to display the received picture information on the measurement instruction screen. Thus, while observing the operation of the measuring apparatus and the motion of the probe displayed on the measurement instruction screen, the operator can perform the remote control measuring operation.

A third aspect of the present invention is a recording medium storing a remote control process program for a remote control measuring system, the program having the process steps of displaying a measurement instruction screen, transmitting a measurement instruction, which is generated in response to an input operation on the measurement instruction screen, to a host computer, and displaying measured information received from the host computer in response to the measurement instruction.

These and other objects, features and advantages of the present invention will become more apparent in light of the following detailed description of a best mode embodiment thereof, as illustrated in the accompanying drawings.

BRIEF DESCRIPTION OF THE DRAWINGS

FIGS. 4A and 4B are examples of part programs transmitted from the apparatus shown in FIG. 3.

DETAILED DESCRIPTION OF THE PREFERRED EMBODIMENT

Next, with reference to the accompanying drawings, a three-dimensional measuring system according to an embodiment of the present invention will be described.

Figure 1:
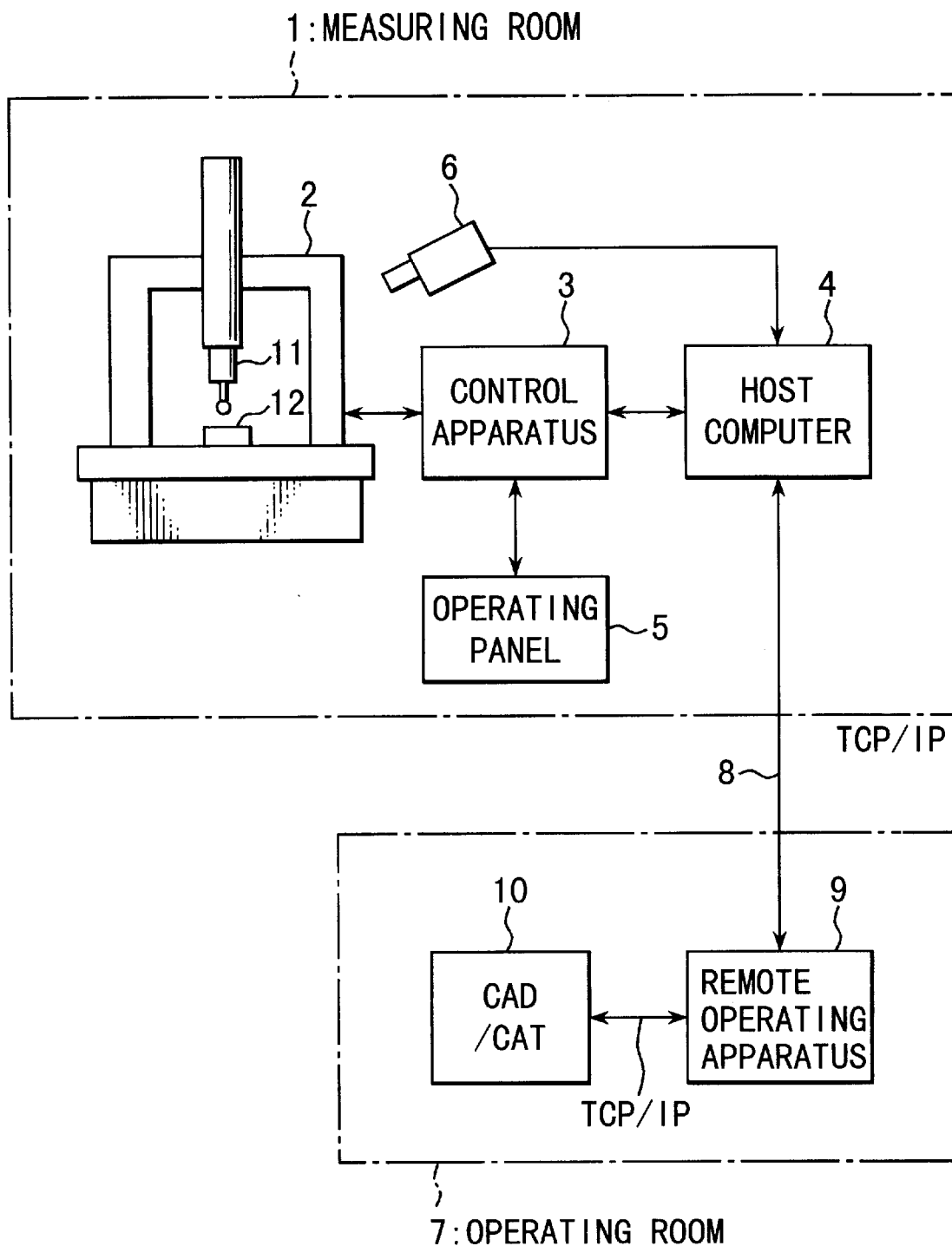
FIG. 1 is a block diagram showing the structure of a three-dimensional measuring system according to an embodiment of the present invention.

In FIG. 1, a measuring room 1 is strictly controlled for room temperature, humidity, atmosphere, and so forth. In the measuring room 1, a three-dimensional measuring apparatus 2, a control apparatus 3, a host computer 4, and an operating panel 5 are disposed. The three-dimensional measuring apparatus 2 measures an object. The control apparatus 3 drives and controls the three-dimensional measuring apparatus 2. The host computer 4 transmits a measurement instruction to the control apparatus 3 and receives measured information therefrom. The operating panel 5 manually operates the three-dimensional measuring apparatus 2 through the control apparatus 3.

The control apparatus 3 causes a probe 11 of the three-dimensional measuring apparatus 2 to move to and contact a measurement object corresponding to a measurement instruction or a part program received from the host computer 4 or a measurement instruction received from the operating panel 5. In addition, the control apparatus 3 obtains measured information corresponding to a touch signal of the probe 11. In the measuring room 1, a TV camera 6 is disposed as a photographing device that monitors the measurement state of the three-dimensional measuring apparatus 2. Picture information is transmitted from the TV camera 6 to the host computer 4.

A operating room 7 is, for example, disposed at a remote position of the measuring room 1. In the operating room 7, a remote operating apparatus 9 and a CAD/CAT system 10 are disposed. The remote operating apparatus 9 is connected to the host computer 4 of the measuring room 1 through a communication network 8 such as a LAN (Local Area Network) or a public telephone circuit. The CAD/CAT system 10 is linked to the remote operating apparatus 9.

The remote operating apparatus 9 has functions for displaying a measurement instruction screen, generating a measurement instruction (for example, an environment setup instruction such as measurement speed) corresponding to a instruction data that is input on the measurement instruction screen, generating a part program corresponding to a measurement element, transmitting the measurement instruction to the CAD/CAT system 10, and transmitting a part program generated on the CAD/CAT side to the host computer 4. In this embodiment, data is communicated between the host computer 4 and the remote operating apparatus 9 by a communication protocol of TCP/IP (Transmission Control Protocol/Internet Protocol). When the remote operating apparatus 9 and the CAD/CAT system 10 are disposed at remote positions each other, data therebetween is exchanged by TCP/IP. However, the remote operating apparatus 9 and the CAD/CAT system 10 may share the same hardware.

Figure 2:
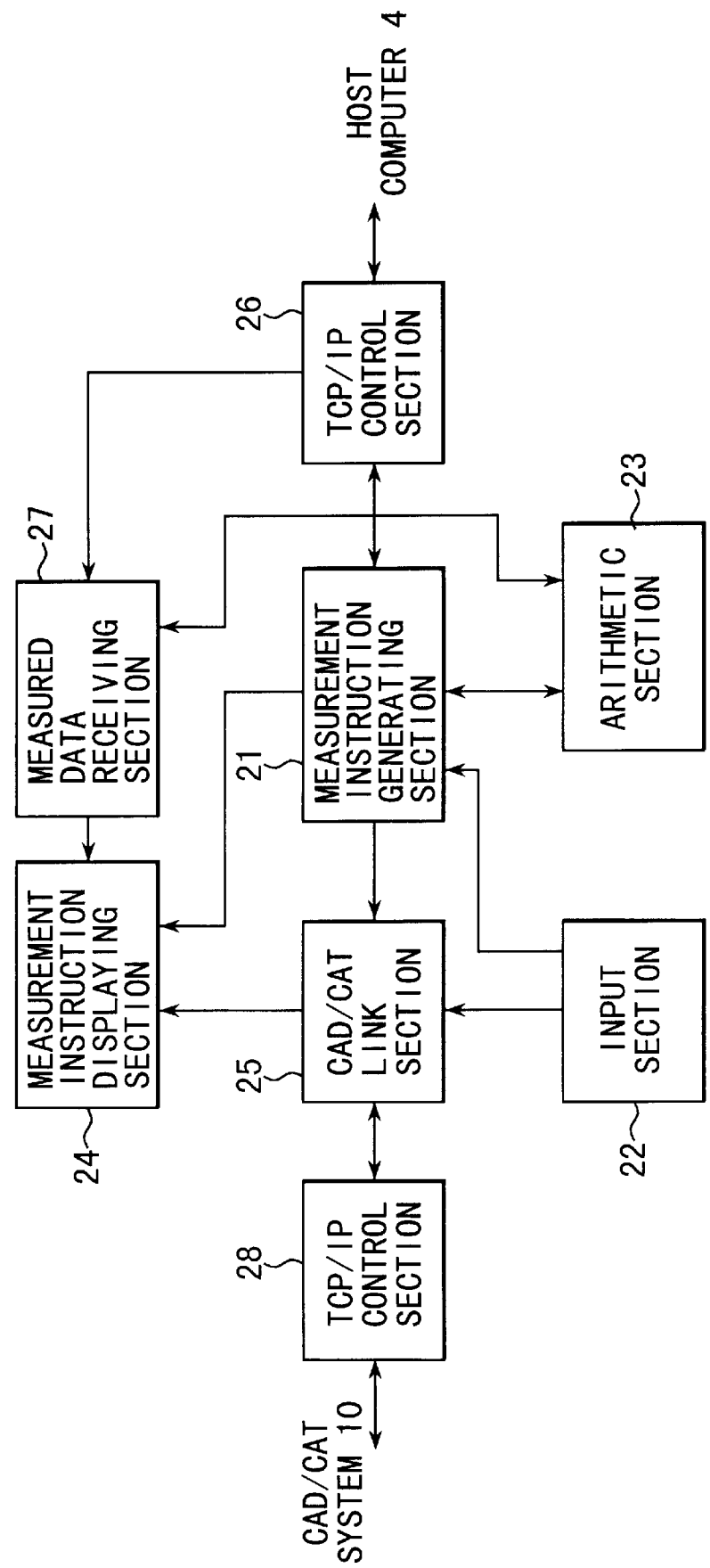
FIG. 2 is a functional block diagram showing a remote operating apparatus of the system shown in FIG. 1.

FIG. 2 is a functional block diagram showing the remote operating apparatus 9 accomplished by computer hardware and relevant software.

In FIG. 2, a measurement instruction generating section 21 generates a measurement instruction for the three-dimensional measuring apparatus in response to instruction information received from an input section 22. An arithmetic section 23 performs calculations necessary for the measurement instruction. A measurement instruction displaying section 24 generates and displays the measurement instruction screen for measurement instructing. A CAD/CAT link section 25 performs a link function such as activating, connecting, or switching the CAD/CAT system 10 corresponding to the measurement instruction.

A TCP/IP control section 26 controls for transmitting/receiving the measurement instruction and measured information between the measurement instruction generating section 21 and the host computer 4 corresponding to the communication protocol of TCP/IP. The received measured information includes measured data, error information, and environment setup data. These information are stored in a measured data receiving section 27. When necessary, these information are supplied to the arithmetic section 23. Thus, the arithmetic section 23 obtains the distance between two points, angle, and so forth. A TCP/IP control section 28 controls for transmitting/receiving the measurement instruction and part programs with the CAD/CAT system 10 corresponding to the communication protocol of TCP/IP.

The above-described functions of the remote operating apparatus 9 are accomplished by for example a computer program. The program is provided as a Next, the operation of the three-dimensional measuring system will be described.

Figure 3:
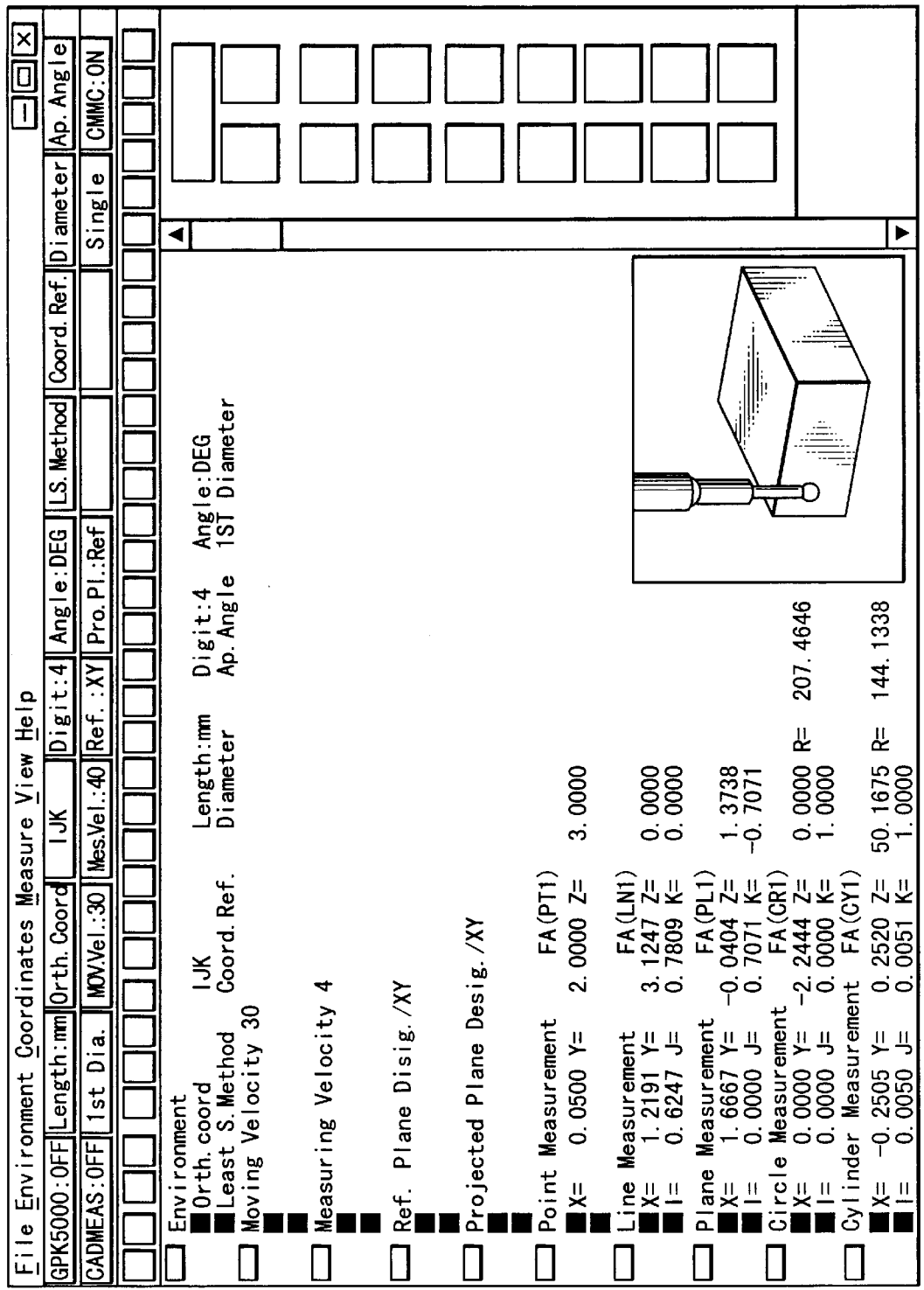
FIG. 3 is an example of a measurement instruction screen displayed by the apparatus shown in FIG. 2.

FIG. 3 is an example of the measurement instruction screen displayed on the measurement instruction displaying section 24 of the remote operating apparatus 9. On the measurement instruction screen, there are a file menu, an environment menu, a coordinate system menu, a measurement menu, a display menu, and a help menu as follows.

1) File menu: having commands for activating, linking, and switching the CAD/CAT system, commands for reading and storing the measured results, and a command for quitting the system.

2) Environment menu: having commands for setting measurement and display environments, CNC moving velocity and measuring velocity of the three-dimensional measuring apparatus, generating a part program in run mode, switching of online/offline teaching mode, reading the current position of the three-dimensional measuring apparatus, and setting a projection surface.

3) Coordinate menu: having commands for setting a reference plane of a coordinate system, rotating an axis, origin, and coordinate system, and traveling an object.

4) Measurement menu: having commands for measuring an element, collating an intersection, and calculating a distance, an angle, an intersection, and a middle point. The element measurement commands include commands for measuring a point element, a circle element, a line element, a plane element, a cylinder element, a circular cone element, a sphere element, and an ellipse element.

5) Display menu: having commands for displaying a result, erasing a result display screen, and switching display/non-display of various tool bars.

Commands that are frequently used are iconized.

Next, a real system operation will be described.

For example, to set up a speed condition, the operator selects "speed designation" on the measurement instruction screen of the remote operating apparatus 9. Thereafter, the operator designates the moving velocity and measuring velocity of the probe 11 of the three-dimensional measuring apparatus 2 and then presses the run button. The remote operating apparatus 9 generates a part program as shown in FIG. 4A corresponding to the input conditions and transmits the part program to the host computer 4 through the communication network 8. The host computer 8 transmits the resultant data to the remote operating apparatus 9. The remote operating apparatus 9 displays the setup result on the measurement instruction screen as shown in FIG. 3.

When the operator measures a circle, he or she selects "circle measurement" icon on the measurement instruction screen, inputs a label name and the number of measurement points of the measured result, and presses the run button. The resultant condition is transmitted to the CAD/CAT system 10. Thus, the measurement instruction screen is switched to a screen of the CAD/CAT system 10. The screen of the CAD/CAT system 10 displays a figure corresponding to CAD data of the measurement object. The operator selects a circle to be measured. In addition, the operator sets up conditions such as an inner/outer circle and an approach direction of the measurement probe corresponding to a measurement instruction displayed on the screen and then selects measurement start.

Thus, the CAD/CAT system 10 generates a part program that defines a measurement path and executes arithmetic instructions for measuring the designated circle as shown in FIG. 4B and transmits the part program to the remote operating apparatus 9. The remote operating apparatus 9 transmits the part program to the host computer 4 through the communication network 8 by the communication protocol of TCP/IP. The host computer 4 supplies the received part program to the control apparatus 3. Thus, the three-dimensional measuring apparatus 2 starts the measurement operation corresponding to the part program. The resultant measured data is transmitted to the remote operating apparatus 9 through the control apparatus 3, the host computer 4 and the communication network 8. The remote operating apparatus 9 stores the measured data to the measured data receiving section 27 and displays the measured data on the measurement instruction screen as shown in FIG. 3.

In this case, since the probe traveling path is generated by the CAD/CAT system 10, the measurement object can be accurately measured regardless of the experience of the operator. For example, when a hole diameter is measured with three points, the probe 11 can be more accurately contacted to the measurement object at intervals of 120° than the case that the operator operates a joystick on the operating panel 5. Thus, according to the present invention, the reliability of the measured result is improved. The CAD/CAT system 10 may be constructed by use of a commercially available CAD. For example, a module that generates a traveling path of the probe 11 is formed with Autocad (made by IBM) and added to the CAD menu, whereby the CAD/CAT system 10 can be structured.

When an error takes place in the measurement operation of the circle, the control apparatus 3 suspends the measurement process and transmits error information to the host computer 4. The host computer 4 transmits the received error information to the remote operating apparatus 9 through the communication network 8. The remote operating apparatus 9 displays the detected error on the measurement instruction screen. Thus, when the operator acknowledges that the error is a recoverable error, he or she inputs an error recovery command on the measurement instruction screen so as to transmit the error recovery instruction to the control apparatus 3 through the host computer 4. Thus, the host computer 4 causes the control apparatus 3 to recover from the error. Thereafter, the suspended measurement is resumed depending on the decision of the operator.

As described above, in the measuring room 1, the TV camera 6 is disposed so as to face the three-dimensional measuring apparatus 2. A picture photographed by the TV camera 6 is transmitted to the remote operating apparatus 9 through the host computer 4 and the communication network 8 by the communication protocol of TCP/IP. The picture photographed by the TV camera 6 is displayed in a window formed on the screen as shown in FIG. 3. Thus, the operator can easily confirm the operation of the three-dimensional measuring apparatus 2 and an occurrence of an error such as a collision of the probe 11 to the measurement object 12.

With a part program generated by the CAD/CAT system 10 and the remote operating apparatus 9, a part program file can be generated. Instructions for speed designation and circle measurement are issued as part programs to the control apparatus 3. Thus, when the control apparatus 3 designates a file name and enters into part program record mode, these instructions are recorded as part program files.

In the above-described embodiment, a system that remote-controls a three-dimensional measuring apparatus was described. However, the present invention is not limited to such a system. Instead, the present invention can be applied to a remote control measuring system with another measuring apparatus such as a shape measuring apparatus.

As described above, according to the present invention, a measurement instruction generated in response to an instruction data that is input on the measurement instruction screen of the remote operating apparatus, a part program, and so forth are transmitted to the host computer through a communication network, whereby the measurement operation is started up. The resultant measured information is immediately sent back to the remote operating apparatus and displayed on the measurement instruction screen thereof. Thus, since the operator does not need to manually create part programs, he or she can easily operate the system. When an error takes place, the system immediately detects it, changes the measurement procedure, and resumes the measurement.

In addition, according to the present invention, since measurement instructions and measured information are exchanged between the host computer and the remote operating apparatus through the communication network, there is no restriction about the distance for which a remote control is performed. Thus, the operator can perform a measurement operation without need to enter into a measuring room and a production line in which the temperature is strictly controlled.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

The entire disclosure of Japanese Patent Application No. 9-152621 filed on Jun. 10, 1997 including specification, claims, drawings and abstract are incorporated herein by reference in its entirety.

What is claimed is:

1. A remote control measuring system, comprising:
   a measuring apparatus;
   photographing means for photographing a measurement state of said measuring apparatus;
   a control apparatus for controlling and driving said measuring apparatus corresponding to a measurement command and obtaining measured information of said measuring apparatus;
   a host computer for transmitting the measurement command to said control apparatus corresponding to a measurement instruction and receiving the measured information and picture information obtained by said photographing means; and
   a remote operating apparatus for transmitting the measurement instruction to said host computer through a communication network and receiving the measured information and the picture information therefrom,
   wherein said remote operating apparatus displays a measurement instruction screen, generates the measurement instruction in response to an input operation on the measurement instruction screen, transmits the measurement instruction to said host computer, and displays the measured information and the picture information received from said host computer on the measurement instruction screen.

2. The remote control measuring system according to claim 1,
   wherein said host computer and said remote operating apparatus mutually communicate with each other corresponding to a communication protocol of TCP/IP (Transmission Control Protocol/Internet Protocol).

3. The remote control measuring system according to claim 1,
   wherein said measuring apparatus is a three-dimensional measuring apparatus.

4. A remote control measuring system, comprising:
   a measuring apparatus;
   a control apparatus for controlling and driving said measuring apparatus corresponding to a measurement command and obtaining measured information of said measuring apparatus;
   a host computer for transmitting the measurement command to said control apparatus corresponding to a measurement instruction and receiving the measured information therefrom;
   a remote operating apparatus for transmitting the measurement instruction to said host computer through a communication network and receiving the measured information therefrom; and
   a CAD/CAT (Computer Aided Design/Computer Aided Testing) system linked to said remote operating apparatus,
   wherein said remote operating apparatus has a measurement instruction screen displaying function and a CAD/CAT system connecting/switching function, and
   wherein said remote operating apparatus switches to a screen of said CAD/CAT system in response to an input operation on the measurement instruction screen, allows the operator to input a command on a figure displayed on the screen of said CAD/CAT system, transmits part programs corresponding to measurement elements generated in said CAD/CAT system to said host computer, and displays measured information received from said host computer to the measurement instruction screen.

5. The remote control measuring system according to claim 4,
   wherein said host computer and said remote operating apparatus mutually communicate with each other corresponding to a communication protocol of TCP/IP.

6. The remote control measuring system according to claim 4,
   wherein said remote operating apparatus and said CAD/CAT system mutually communicate with each other corresponding to a communication protocol of TCP/IP.

7. The remote control measuring system according to claim 4, further comprising:
   photographing means for photographing a measurement state of said measuring apparatus,
   wherein said host computer transmits picture information obtained by said photographing means to said remote operating apparatus through the communication network, and
   wherein said remote operating apparatus displays the received picture information on the measurement instruction screen.

8. The remote control measuring system according to claim 4,
   wherein said measuring apparatus is a three-dimensional measuring apparatus.

* * * * *